United States Patent [19]
Gregg et al.

[11] Patent Number: 6,052,115
[45] Date of Patent: Apr. 18, 2000

[54] USER INTERACTIVE CURSOR CONTROL SYSTEM WITH A PROGRAMMABLE SCALE OF ORTHOGONAL USER MOVEMENTS TO CURSOR MOVEMENTS

[75] Inventors: Leon Edward Gregg, Rochester, Minn.; William Jaaskelainen, Jr., Austin, Tex.

[73] Assignee: International Business Machines Corporation, Armonk, N.Y.

[21] Appl. No.: 09/019,290

[22] Filed: Feb. 5, 1998

[51] Int. Cl.[7] .................................... G09G 5/08
[52] U.S. Cl. ................ 345/159; 345/157; 345/332; 345/333
[58] Field of Search ............... 345/156–163, 345/167, 173, 118–121, 127, 333, 334, 340, 332

[56] References Cited

U.S. PATENT DOCUMENTS

| | | | |
|---|---|---|---|
| 4,386,346 | 5/1983 | Levine | 340/709 |
| 5,012,231 | 4/1991 | Felsenstein | 340/709 |
| 5,191,641 | 3/1993 | Yamamoto et al. | 395/118 |
| 5,504,500 | 4/1996 | Garthwaite et al. | 345/157 |
| 5,530,455 | 6/1996 | Gillick et al. | 345/163 |
| 5,563,629 | 10/1996 | Caprara | 345/160 |
| 5,570,111 | 10/1996 | Barrett et al. | 345/157 |
| 5,805,161 | 8/1998 | Tiphane | 345/341 |
| 5,872,566 | 2/1999 | Bates et al. | 345/341 |
| 5,874,936 | 2/1999 | Berstis et al. | 345/123 |
| 5,883,619 | 3/1999 | Ho et al. | 345/163 |

*Primary Examiner*—Richard A. Hjerpe
*Assistant Examiner*—Henry N. Tran
*Attorney, Agent, or Firm*—Jerry B. Kraft; Jeffrey S. LaBaw

[57] ABSTRACT

In a computer controlled user interactive display, a system is provided for controlling cursor movement on the display screen involving a user activated cursor control device connected to said computer movable in the four orthogonal directions. The system has conventional means for converting the user activated orthogonal movements into cursor movements in said orthogonal directions on said display screen and user interactive means for scaling said cursor movements in each of said four orthogonal directions relative to the corresponding movements in said cursor control device. The invention is particularly directed to such cursor movement rate scaling in respective windows.

17 Claims, 7 Drawing Sheets

USER INTERACTIVE CURSOR CONTROL SYSTEM WITH A PROGRAMMABLE SCALE OF ORTHOGONAL USER MOVEMENTS TO CURSOR MOVEMENTS

TECHNICAL FIELD

The present invention relates to user interactive computer supported display technology and particularly to such user interactive systems and methods which are user friendly and provide even noncomputer-literate users with an interface environment which is easy to use, particularly with respect to screen cursor movements.

BACKGROUND OF THE INVENTION

The 1990's decade has been marked by a societal technological revolution driven by the convergence of the data processing industry with the consumer electronics industry. This advance has been even further accelerated by the extensive consumer and business involvement in the Internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces.

Despite all of the great changes which have been made in the computer industry, the screen cursor controlled manually by the user still remains the primary human-computer interface. The user still commands the computer primarily through manual pointing devices such as mice, joysticks and trackballs which control the on screen cursor movements. It must be noted that the principles involved in such pointing devices developed a generation ago when most of the people involved in interfaces to computer were computer professionals who were willing to invest great amounts of time in developing computer skills. It is very possible that had computers originally been the mass consumer, business and industry implements which they are today, user interfaces which were much easier and required less skill to use would have been originally sought and developed. Nonetheless, the manually controlled cursor movement devices are our primary access for cursor control. The present invention is directed to making mouse, trackball and the like cursor control devices more user friendly and effective.

Since cursor control devices such as the mouse translate orthogonal manual movements into cursor movements on the display screen, the user in cramped facilities such as an airplane seat or a lecture hall may find lateral movements difficult. People with limited manual dexterity due to illness may find movement in certain orthogonal directions more difficult than in other directions. In addition, the computer has been found to be most effective as a work saving device in situations requiring a user to interface with the display for a limited number of repetitive functions. In the workplace, these repetitive functions may be performed by people of very limited computer interface skills. Since such users or operators would have limited mouse skills, it would be advantageous to have the ability to program the cursor control system to optimize the effectiveness of user manual orthogonal movements in performing the repetitive functions.

SUMMARY OF THE INVENTION

The present invention is directed to interactive computer controlled display systems and particularly to systems for controlling cursor movement on the display screen. There is provided a user activated cursor control device such as a trackball or mouse which is movable in the four orthogonal directions. The control device is connected to the computer which includes means for converting the user activated orthogonal movements into cursor movements in said four directions. The present invention provides user interactive means in said computer for scaling said cursor movements in each of said four orthogonal directions relative to the corresponding movements in said cursor control device. The invention involves means in said computer defining a default scaling value for the cursor movements in each of said four orthogonal directions, and user interactive means for changing said default scaling values for the cursor movements in each of said four orthogonal directions. In accordance with a further aspect of the invention, there are means defining regions on said display screen wherein cursor movements in one orthogonal direction have different scaling values from the scaling values of movements in the same one orthogonal direction in regions adjacent to said defined regions. This will provide optimum cursor movement with respect to the user's manual movement of the control device according to the levels of user interactivity in various display screen regions. It is sometimes the case that screen interactivity levels vary in relation to the four quadrants of a screen or a screen window formed by the X,Y axes. In such cases, the present invention may be applied to varying the scaling of the cursor movements to optimize cursor movement relative to activity in the respective quadrants.

In a preferred aspect of the invention, in situations where the cursor is being moved at a scaling value other than the default value, the image of the cursor may be changed as an indication that its scaling value has been so changed. This would include making the cursor brighter, blinking the cursor or changing the color or shape of the cursor.

DETAILED DESCRIPTION OF THE PREFERRED EMBODIMENT

Some typical manual user activated cursor control devices which may be used in the practice of this invention are the mice described in U.S. Pat. No. 4,612,539 or the trackballs described in U.S. Pat. No. 4,786,892 or the trackballs and mice described in U.S. Pat. No. 5,504,500.

Figure 1:
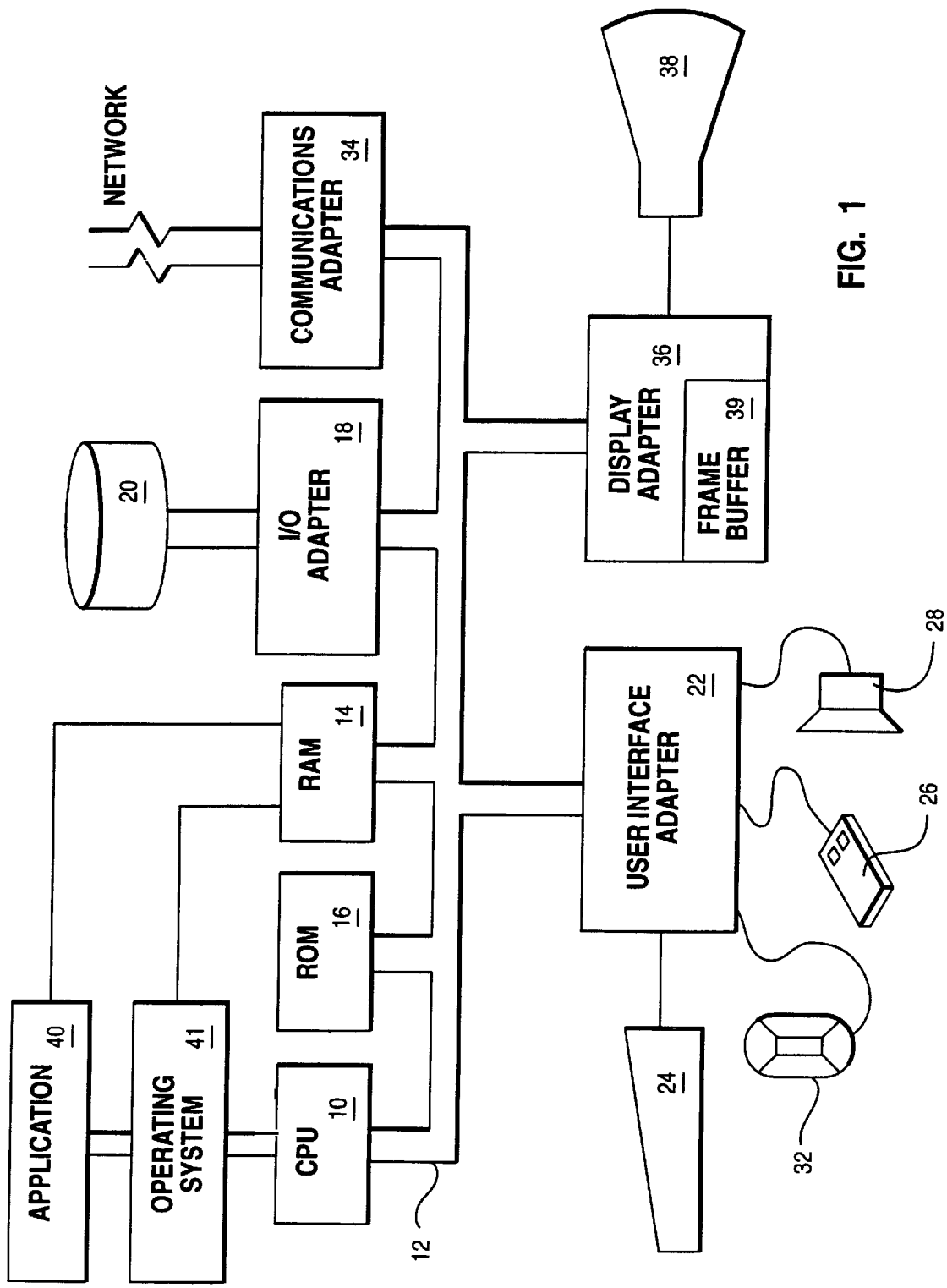
FIG. 1 is a block diagram of a computer controlled interactive display system including a central processing unit which is capable of implementing the present invention.

Referring to FIG. 1, a typical data processing system is shown which may function as the computer controlled display terminal used in implementing the cursor control system of the present invention. A central processing unit (CPU), such as one of the personal computer microprocessors available from International Business Machines Corporation, is provided and interconnected to various other components by system bus 12. An operating system 41 runs on CPU 10, provides control and is used to coordinate the function of the various components of FIG. 1. Operating system 41 may be one of the commercially available operating systems such as DOS or Windows 95 (™) marketed by Microsoft Corporation or the OS/2 (™) operating system available from International Business Machines Corporation. The programming applications operating in the computer, including the application of the present invention to be subsequently described in detail is within application unit 40 and run in conjunction with operating system 41 to provide output calls to the operating system 41 which implement the various functions to be performed by the applications 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes, of course, the internet. I/O devices are also connected to system bus 12 via user interface adapter 22 and display adapter 36. Keyboard 24 and speaker 28 as well as trackball 32 and mouse 26 to be used as the cursor control devices in the practice of this invention are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, i.e. trackball 32 or mouse 26, a user is capable of providing the manual orthogonal cursor control movements in the practice of the present invention and receiving output information from the system via speaker 28 and display 38.

Figure 2:
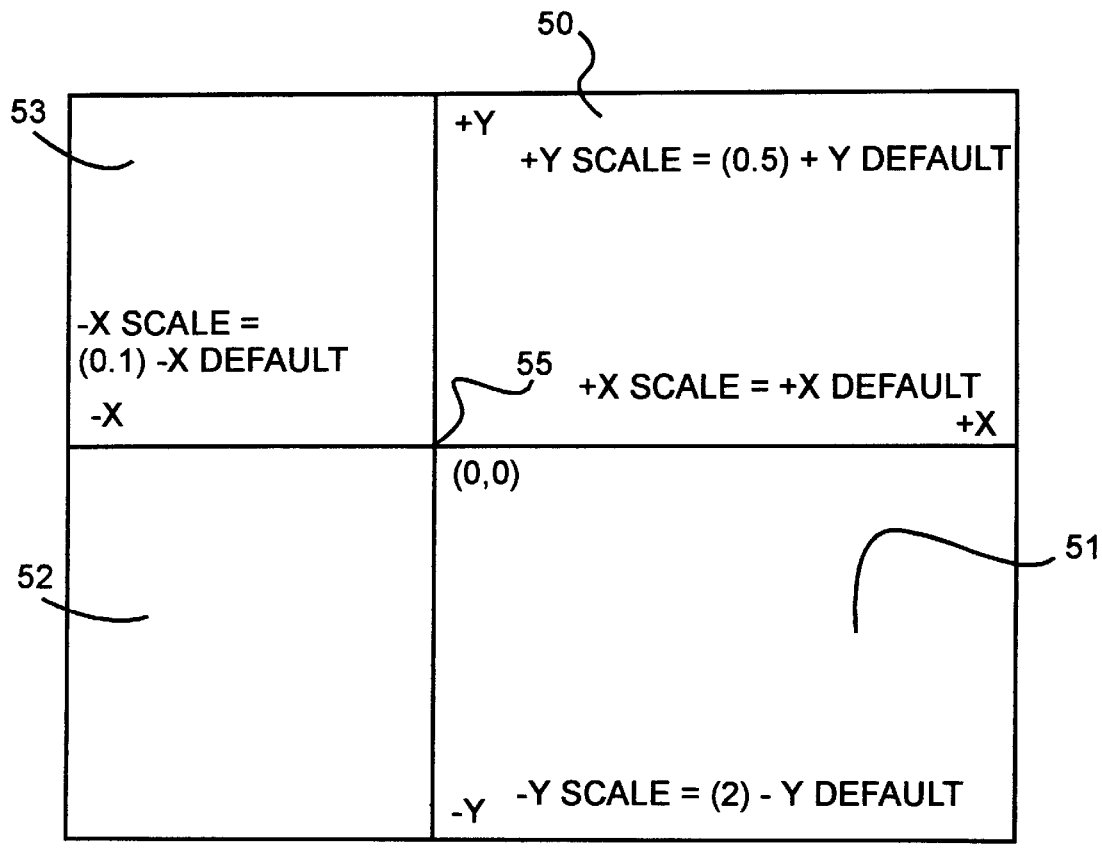
FIG. 2 is a diagrammatic view of a display screen illustrating how the cursor movements in the four quadrants formed by the X,Y axes may be scaled so that the rate of cursor movement relative to its controlling manual device may vary in each respective quadrant.

The operation of the present invention will now be described commencing with FIG. 2 which is a diagrammatic view of a display screen illustrating how the cursor movements in the four quadrants formed by the X,Y axes may be scaled so that the rate of cursor movement relative to its controlling manual device may vary in each respective quadrant. For purposes of this description, we will be using a mouse as the manual cursor control device. The quadrants of the screen of FIG. 2 are defined by the X,Y axes which cross at the origin 51 (0,0). The quadrants are: +X, +Y, 50; +X, −Y, 51; −X, −Y, 52; and −X, +Y, 53. The scale of amounts of cursor movements on the screen relative to the manual movements of the mouse on its pad with respect to the four orthogonal directions are indicated; as will be described hereinafter in greater detail with respect to the flow charts of FIGS. 7 and 8. Initially, the scales in each of the four directions are set at default values and the system permits the user to change these values. Thus, in the setup of FIG. 2, the scale for the +X direction is set at its default value; in the −X direction, the scale is 0.1 times its default; in +Y, the scale is 0.5 times default while −Y scale is two times the default value.

Figure 3:
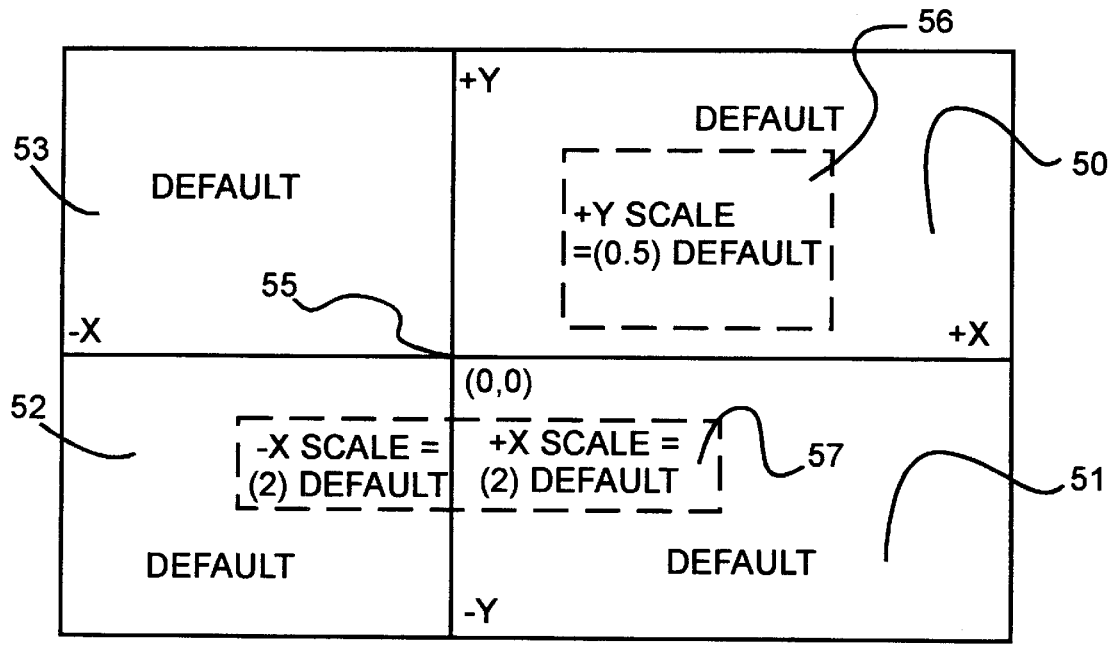
FIG. 3 is a diagrammatic view of a display screen illustrating how the cursor movements in different screen regions may be scaled so that the rate of cursor movement relative to its controlling manual device may vary in each respective region.

The regions on the screen in which scales of cursor value vary need not be defined by the four quadrants; definite regions may be set within or traversing quadrant boundaries as in FIG. 3, which is a diagrammatic view of a display screen with such regions. In this arrangement, the four quadrants 50, 51, 52 and 53 are set at the four X,Y orthogonal directions default values, but region 56 within quadrant 50 and region 57 traversing quadrants 52 and 51 are set at orthogonal movement scales different from their respective quadrants. Within region 56, +X remains at the default scale value while +Y is modified to 0.5 times the +Y default value. In region 57, the +Y and −Y values remain at default scale value while the +X and −X values are respectively modified to two times their default values.

Figure 4:
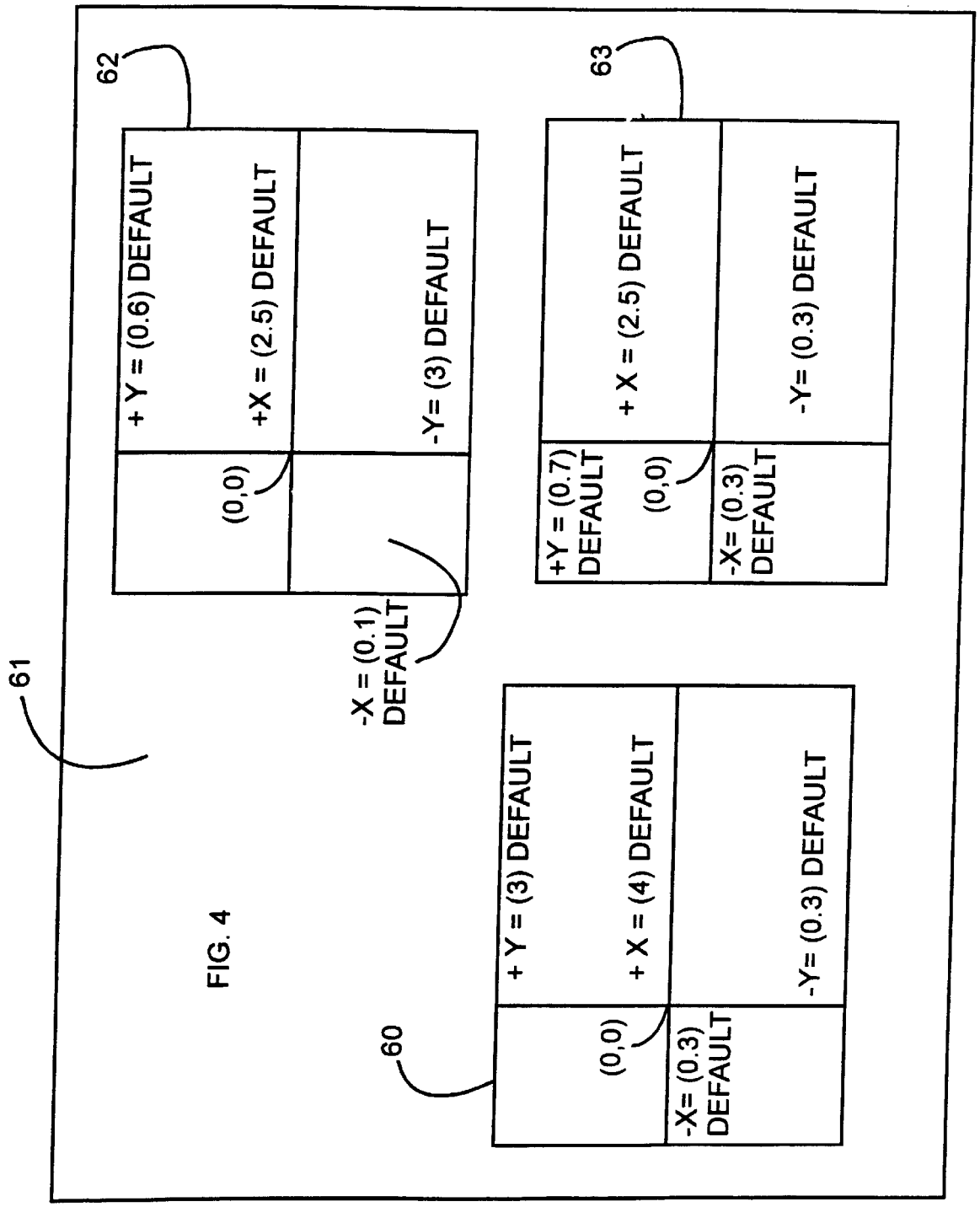
FIG. 4 is a diagrammatic view of a display screen having a plurality of windows illustrating how the cursor movements in the four quadrants formed by the X,Y axes in each of the windows may be scaled so that the rate of cursor movement relative to its controlling manual device may vary in each respective quadrant of each window.
Figure 5:
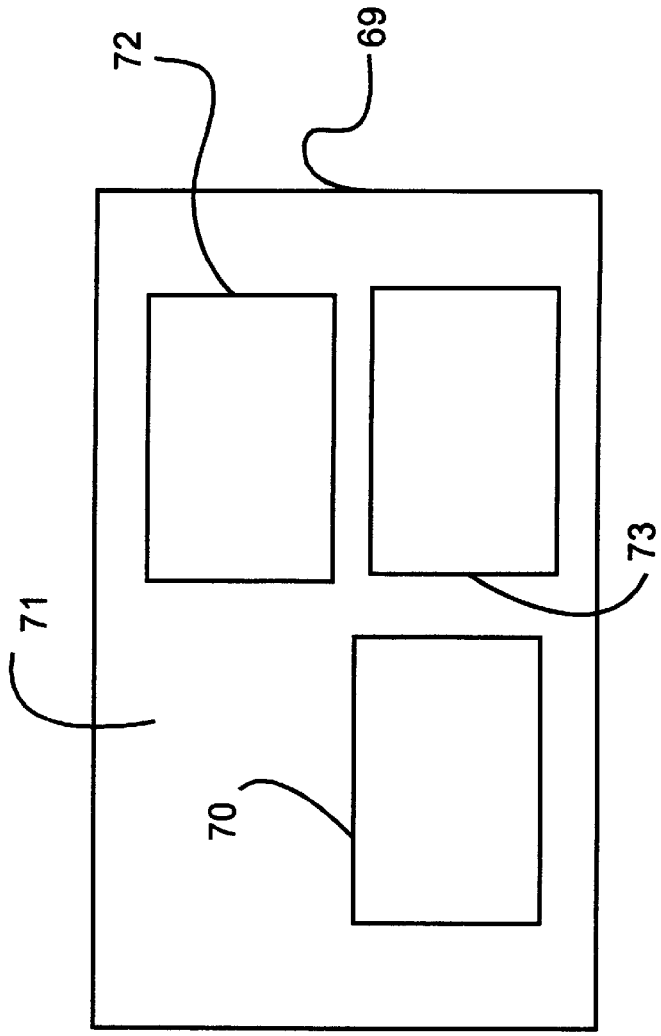
FIG. 5 is a diagrammatic view of an interactive user data entry display screen which may be used to set and modify rate scales of cursor movement relative to the cursor controlling manual device in the X, −X, Y and −Y directions on the entire screen and the plurality of windows on the screen.

The regions of varying cursor movement scales may be within windows on the screen as illustrated in FIG. 4, which is a diagrammatic view of a display screen having a plurality of windows illustrating how the cursor movements in the four quadrants formed by the X,Y axes in each of the windows may be scaled so that the rate of cursor movement relative to its controlling manual device may vary in each respective quadrant of each window. Because the windowing environment is the interface currently of choice in interactive user interfaces, this screen arrangement is the one most likely to be used in interfaces. For this illustration, let us assume that the entire screen 61, exclusive of the windows, is set at the default cursor movement scale in all four orthogonal directions and windows 60, 62 and 63 have the scale values listed in FIG. 4 for the four orthogonal directions in each. Let us now consider how the user may set the cursor movement scale values for his needs in a windowing arrangement like that of FIG. 4. At the starting or initial screen set up, the entire screen 61 and each of its windows 60, 62 and 63 have cursor movement scaling values set at default values for all orthogonal directions in each. When the user wishes to change values, he interactively brings up the data entry screen shown in FIG. 5. Let us assume that he wishes to arrange for the scaling values for the windows indicated in FIG. 4, he will click on the command: "MODIFY X,Y SCALE FOR SELECTED WINDOW" in FIG. 5. This will activate the window selection icon 69 and the system then prompts to "CLICK ON WINDOW TO BE MODIFIED" and the user makes a selection from window representations 70, 72 and 72 on the icon 69 which respectively corresponds to windows 60, 62 and 63 in FIG. 4. For other activities, region 71 on icon 69, FIG. 5, represents the entire window 61 in FIG. 4. The user then makes the desired cursor movement scale modifications one window at a time and clicks on and, thus, selects representation 70. The result is the data entry screen shown in FIG. 6. Drop down menu 82 appears from which the user may in turn make cursor movement scaling selections for the four orthogonal directions in the selected window by moving sliders 76, 77, 80 and 81, respectively, representative of the four orthogonal directions indicated against scale 75 which represents values from 0.1 to 5 times the default scaling value for each orthogonal cursor movement direction. In turn, representations 72 and 73 respectively representative of windows 62 and 63 in FIG. 4 may be selected and the same procedure followed to set the scaling values in those windows. Also, it will be understood that the process described with respect to FIGS. 5 and 6 for scaling the windows of FIG. 4 may also be used to scale orthogonal cursor movements in defined regions such as regions 56 and 57 in FIG. 3.

Figure 6:
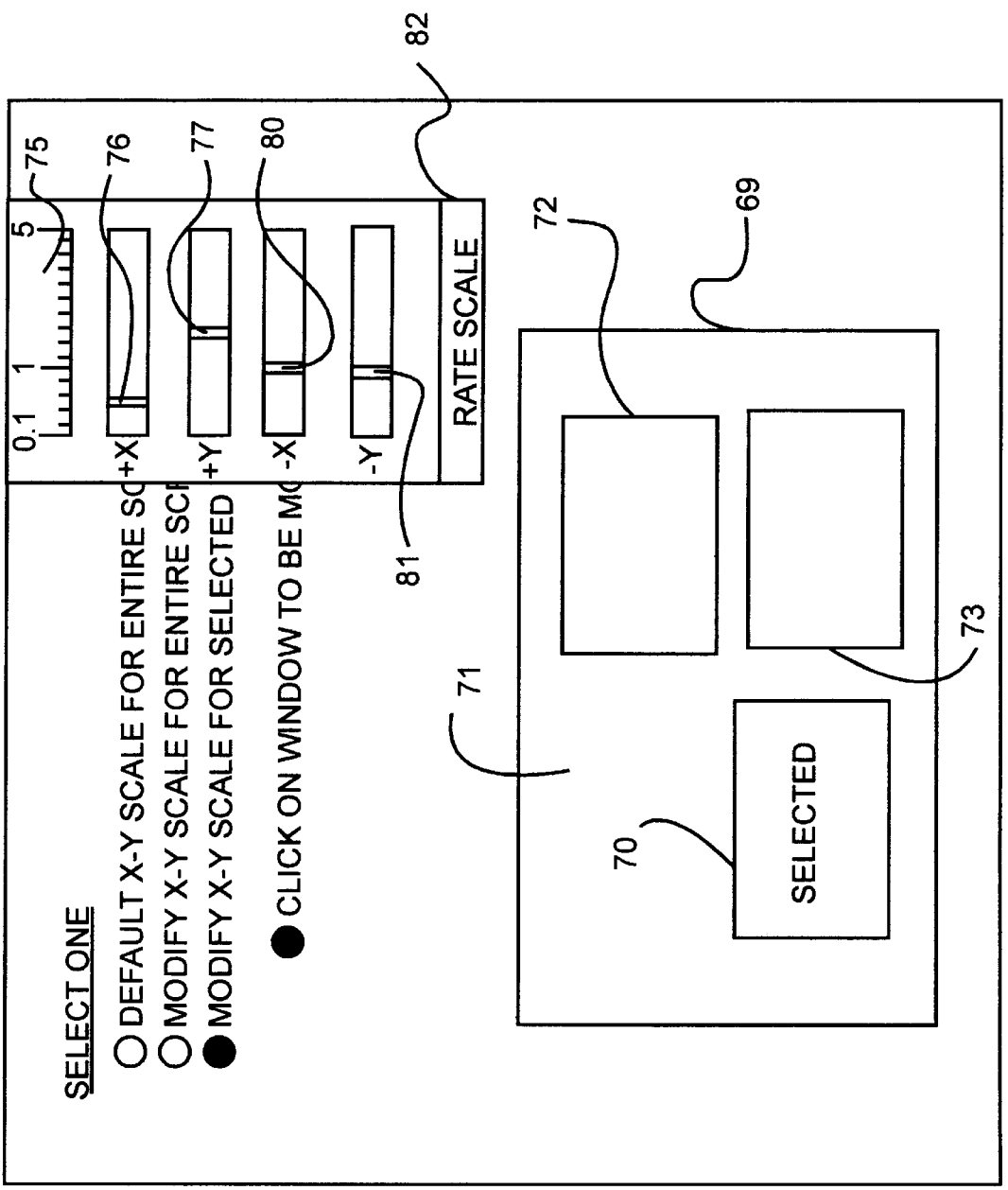
FIG. 6 is the diagrammatic view of the screen of FIG. 5 during the entry of modifications of said cursor movement rate scales in one of the windows on the screen.
Figure 7:
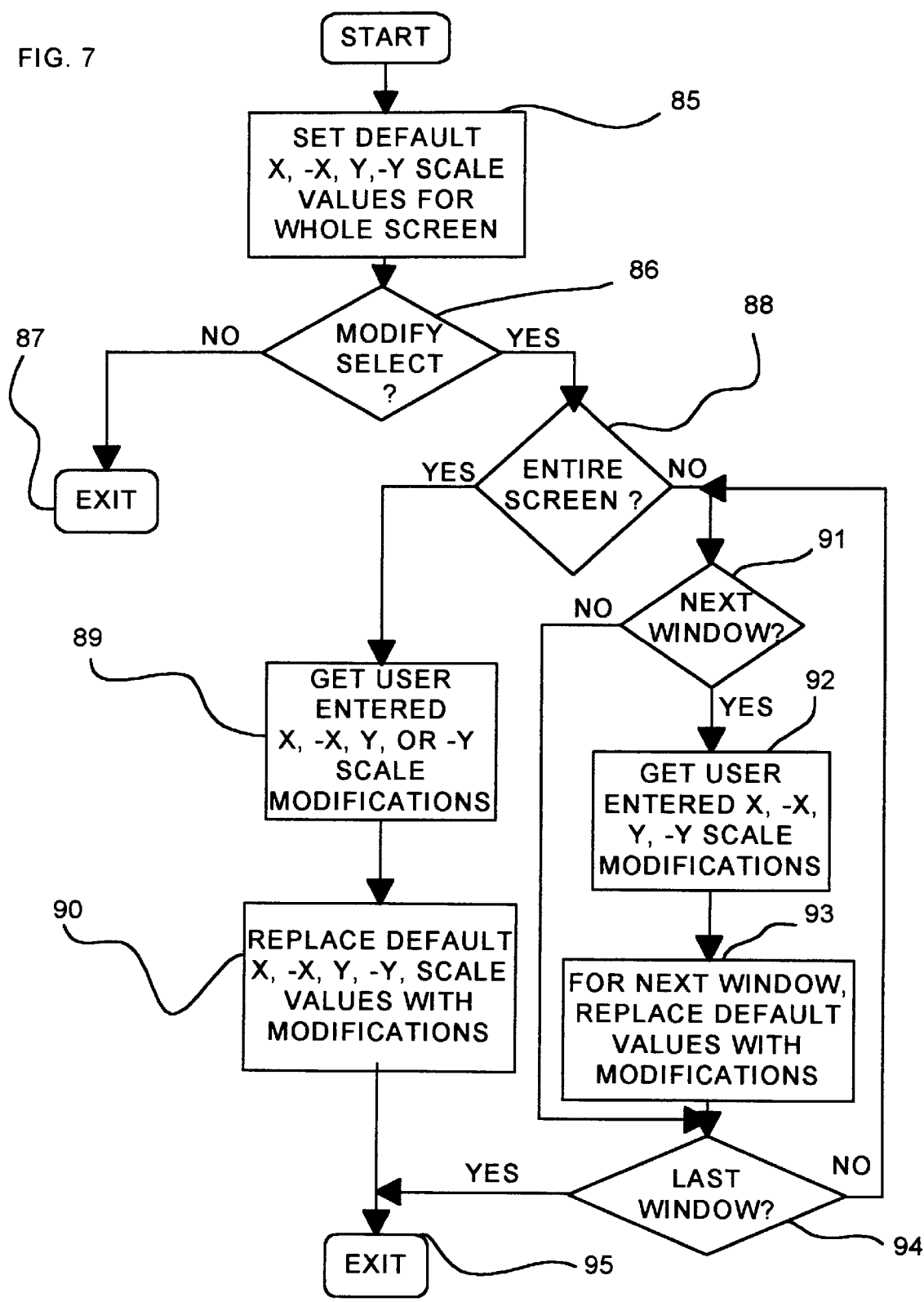
FIG. 7 is a flow chart of the program steps involved in setting and modifying cursor movement scale rates in each of a plurality of windows on a display screen having a plurality of windows as shown in FIGS. 5 and 6.
Figure 8:
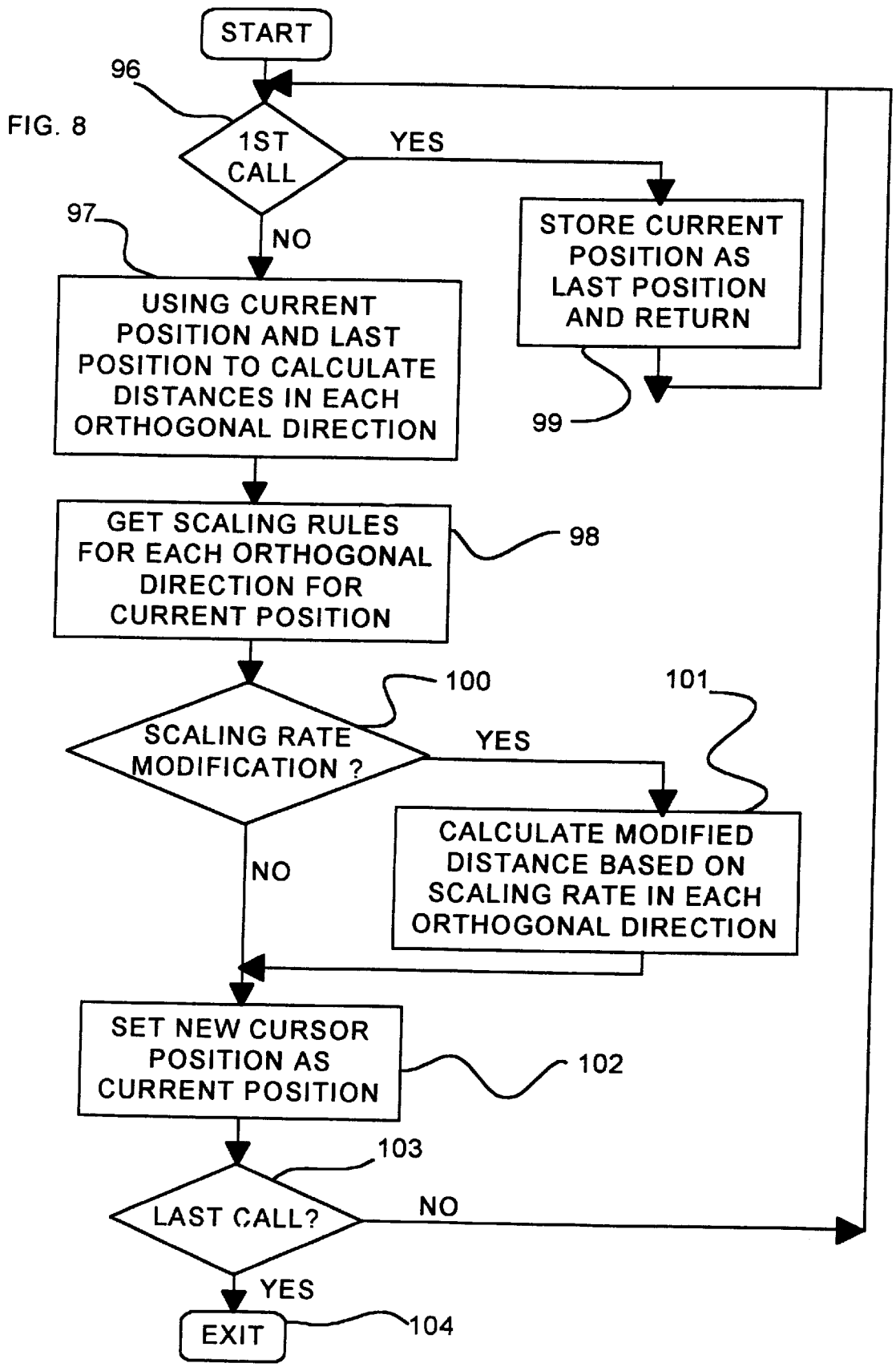
FIG. 8 is a flowchart of the steps involved in applying the system of the present invention to a cursor being moved by a user activated cursor control device.

Now with respect to FIG. 7, there will be described a flowchart of the program steps involved in setting and modifying cursor movement scale rates in each of a plurality of windows on a display screen having a plurality of windows as shown in FIGS. 5 and 6. When the running of the program is commenced the default cursor movement scaling values in the four orthogonal directions, +X, −X, +Y and −Y, is set for the whole screen and applies to any windows on the screen, step 85. A determination is then made as to whether any scaling value modification has been selected by the user, step 86. If No, then no modifications have to be made. The default values in the entire screen stand and the program is exited, step 87. If Yes, then, in decision step 88, a determination is made as to whether the user intends the modification to apply to the entire screen (based upon the data entry input via the screens of FIGS. 5 and 6. If Yes, then in step 89, the user modifications in the four orthogonal directions are obtained (data entry screen of FIG. 6) and these are used to replace the default values, step 90, after which the program is exited, step 95. If No, then the modification must be applicable to the specific windows on the screen and the following procedure is done window-by-window until all of the modifications of cursor movement scaling values are made in all of the windows on the screen. First, a determination is made as to whether the next window has modifications, step 91. This window may, of course, be the first or any subsequent window. If No, then this window is not selected by the procedure of FIG. 6, and the flow goes to step 94 where a determination is made as to whether this is the last window. If Yes, then modification of scaling values is complete and the program is exited, step 95. If Yes, then the flow loops back to step 91 and the process is repeated for the next window. Now if it is determined in step 91 that there are modifications made to orthogonal cursor movement scaling values in this next window as requested by the user via the date entry screen of FIG. 6, then, step 92, these modifications are obtained and the default values for the window are replaced with them, step 93. Then, the program proceeds to step 94 and the above procedure is repeated until the user modifications to orthogonal cursor movement scaling values as entered via the entry screen of FIG. 6 have completed for all of the windows.

At this point, the modifications to default values, as well as the default values for all of the windows on the screen, have been stored. Let us now with respect to FIG. 8 follow through a procedure for tracking cursor movement on the screen whereby sampling for modifications in default values are made as the cursor moves increment-by-increment. When the program starts a cursor run and the initial cursor position is sampled in first call step 96 a determination that this is the first or initial call results in the current position being stored as the last position and the flow returned to step 96 where the next increment of cursor movement is sampled. This time it will not be the first call and, step 97, by using the current position and the stored last position the cursor movement distance in each orthogonal direction is calculated. But the scaling rules for the particular current position for each orthogonal direction are obtained and based upon these rules, a determination is made, step 100 as to whether these rules call for any scaling rate modification from the default values in any orthogonal direction. If Yes, then for the particular orthogonal direction the distance is modified from the default, step 101, and the new cursor position is set accordingly, step 102. If in step 100, it is found that there is no modification in any orthogonal direction, then the process directly proceeds to step 102 wherein the unmodified default scaling is used for the cursor movement and the unmodified new cursor position is set as the current position in step 102. At this point in the iterative cursor movement sampling, a determination is made in step 103 as to whether we are at the last call, i.e. the last increment of cursor movement is completed. Last call or increment detecting steps in cursor movement programs are well known and any of such implementations may be used. If No, then the flow is returned to step 96 where the next call, i.e. increment, is processed and the above procedure repeated until the last increment of the cursor run is completed and the decision from step 103 is Yes, the particular cursor run is completed and the program is exited, step 104.

Although certain preferred embodiments have been shown and described, it will be understood that many changes and modifications may be made therein without departing from the scope and intent of the appended claims.

We claim:

1. In a computer controlled user interactive display, a system for controlling cursor movement on the display screen comprising:

a user activated cursor control device connected to said computer movable in the four orthogonal directions, means in said computer for converting said user activated orthogonal movements into cursor movements in said four orthogonal directions on said display screen, user interactive means in said computer for scaling said cursor movements in each of said four orthogonal directions relative to the corresponding movements in said cursor control device, and means in said computer for defining regions on said display screen wherein cursor movements in one orthogonal direction have different scaling values from the scaling values of movements in the same one orthogonal direction in regions adjacent to said defined regions.

2. The computer controlled user interactive display of claim 1 further including:

means in said computer defining a default scaling value for said cursor movements in each of said four orthogonal directions, and user interactive means for changing said default scaling values for said cursor movements in each of said four orthogonal directions.

3. The computer controlled user interactive display of claim 1 wherein said defined regions and said adjacent regions are defined from each other by at least one orthogonal axis.

4. The computer controlled user interactive display of claim 2 further including means for changing the image of the cursor when said cursor has a movement scaling value other than a default value.

5. The computer controlled user interactive display of claim 2 further including at least one window wherein said cursor movement in at least one of said orthogonal directions is scaled different from said cursor movement in said same orthogonal direction in a region of said screen outside of said window.

6. The computer controlled interactive display of claim 5 wherein said region is within another window on said screen.

7. In a computer controlled user interactive display with a user activated cursor control device connected to said computer movable in the four orthogonal directions, a method for controlling cursor movement on the display screen comprising:

converting said user activated orthogonal movements into cursor movements in said four orthogonal directions on said display screen, scaling said cursor movements in each of said four orthogonal directions relative to the corresponding movements in said cursor control device, and defining regions on said display screen wherein cursor movements in one orthogonal direction have different scaling values from the scaling values of movements in the same one orthogonal direction in regions adjacent to said defined regions.

8. The method of claim 7 further including the steps of:

defining a default scaling value for said cursor movements in each of said four orthogonal directions, and user interactively changing said default scaling values for said cursor movements in each of said four orthogonal directions.

9. The method of claim 8 wherein said default values in at least one of said orthogonal directions is changed to increase the scaling values.

10. The method of claim 7 wherein said defined regions and said adjacent regions are defined from each other by at least one orthogonal axis.

11. The method of claim 8 further including the step of changing the image of the cursor when a cursor movement scaling value is changed to a value other than a default value.

12. The method of claim 8 wherein said display further includes at least one window and wherein said cursor movement in at least one of said orthogonal directions is scaled different from said cursor movement in said same orthogonal direction in a region of said screen outside of said window.

13. A computer program having data structures included on a computer readable medium for controlling cursor movement on a computer controlled display with a user interactive cursor control device connected to said computer and movable in the four orthogonal directions comprising:

means for converting said user activated orthogonal movements into cursor movements in said four orthogonal directions on said display screen, user interactive means for scaling said cursor movements in each of said four orthogonal directions relative to the corresponding movements in said cursor control device, and means for defining regions on said display screen wherein cursor movements in one orthogonal direction have different scaling values from the scaling values of movements in the same one orthogonal direction in regions adjacent to said defined regions.

14. The computer program according to claim 13 further including:

means defining a default scaling value for said cursor movements in each of said four orthogonal directions, and user interactive means for changing said default scaling values for said cursor movements in each of said four orthogonal directions.

15. The computer program according to claim 13 wherein said defined regions and said adjacent regions are defined from each other by at least one orthogonal axis.

16. The computer program according to claim 14 further including means for changing the image of the cursor when said cursor has a movement scaling value other than a default value.

17. The computer program according to claim 14 further including at least one window wherein said cursor movement in at least one of said orthogonal directions is scaled different from said cursor movement in said same orthogonal direction in a region of said screen outside of said window.

* * * * *